United States Patent
Parikh et al.

(10) Patent No.: US 12,261,639 B1
(45) Date of Patent: Mar. 25, 2025

(54) ADVANCED WIRELESS COMMUNICATION SYSTEM INCORPORATING WIDEBAND FREQUENCY HOPPING

(71) Applicant: Doodle Labs LLC, Marina Del Rey, CA (US)

(72) Inventors: Nimesh D. Parikh, Jacksonville, FL (US); Aaron Vinh Thanh Do, Marina Del Rey, CA (US); Claus Muschallik, Singapore (SG); Simon Wunderlich, Marina Del Rey, CA (US); Ashish Parikh, Venice, CA (US); Amol Parikh, Los Angeles, CA (US)

(73) Assignee: Doodle Labs LLC, Marina Del Rey, CA (US)

( * ) Notice: Subject to any disclaimer, the term of this patent is extended or adjusted under 35 U.S.C. 154(b) by 0 days.

(21) Appl. No.: 18/823,998

(22) Filed: Sep. 4, 2024

Related U.S. Application Data

(60) Provisional application No. 63/537,892, filed on Sep. 12, 2023.

(51) Int. Cl.
  *H04B 1/7143* (2011.01)
  *H04B 1/7156* (2011.01)
(52) U.S. Cl.
  CPC ......... *H04B 1/7143* (2013.01); *H04B 1/7156* (2013.01)
(58) Field of Classification Search
  CPC .............................. H04B 1/7143; H04B 1/7156
  See application file for complete search history.

(56) References Cited

U.S. PATENT DOCUMENTS

| | | | |
|---|---|---|---|
| 5,748,669 A | * | 5/1998 | Yada .......................... H04L 1/02 375/135 |
| 6,215,988 B1 | | 4/2001 | Matero |
| 6,229,399 B1 | | 5/2001 | Tobise et al. |
| 6,584,304 B1 | | 6/2003 | Thomsen et al. |
| 6,704,546 B1 | * | 3/2004 | Lucidarme .......... H04W 52/346 455/450 |
| 7,272,162 B2 | * | 9/2007 | Sano .................... H04B 1/7136 375/135 |
| 7,773,953 B2 | | 8/2010 | Han et al. |
| 8,731,075 B2 | | 5/2014 | Moh |
| 10,148,294 B2 | | 12/2018 | Khlat et al. |

(Continued)

*Primary Examiner* — Sam K Ahn
*Assistant Examiner* — Amneet Singh
(74) *Attorney, Agent, or Firm* — Wendy W. Koba

(57) ABSTRACT

A wireless communication is proposed that utilizes a large available bandwidth (e.g., 10-100,000 MHz) and employs a combination of frequency shifting (from an input RF signal to an IF signal) and frequency hopping from one IF frequency value to another within the available bandwidth. The combination of frequency shifting and frequency hopping adds a level of noise mitigation moving the transmission frequency as a function of time (and avoiding frequencies known to be subject to noise). By its nature, the addition of frequency hopping frustrates the ability of outsiders to access transmissions. A map of frequencies to be used may be delivered to both the transmitter and receiver via a separate command/control signal path. Alternatively, a transmitter may develop the map and forward it to the receiver. The frequency hopping sequence is preferably a randomly-generated sequence that uses the entire available bandwidth.

19 Claims, 7 Drawing Sheets

(56) References Cited

U.S. PATENT DOCUMENTS

| | | |
|---|---|---|
| 11,683,054 B2 | 6/2023 | Cui et al. |
| 2001/0004375 A1* | 6/2001 | Partyka .................... H04K 1/00 |
| | | 375/135 |
| 2005/0030229 A1* | 2/2005 | Spilker ................. G01S 5/0036 |
| | | 342/385 |
| 2006/0193375 A1* | 8/2006 | Lee .................... H04L 27/2014 |
| | | 375/272 |
| 2009/0168846 A1 | 7/2009 | Filippo, III et al. |
| 2009/0279588 A1 | 11/2009 | Mochizuki |
| 2010/0296592 A1 | 11/2010 | Tanaka et al. |
| 2012/0281730 A1 | 11/2012 | Hulvey |
| 2014/0177484 A1 | 6/2014 | Balijapalli et al. |
| 2014/0370832 A1 | 12/2014 | May et al. |
| 2018/0143289 A1 | 5/2018 | Guy et al. |

* cited by examiner

| M1 | |
|---|---|
| FRAME | LO FREQ |
| F1 | $f_4$ |
| F2 | $f_1$ |
| F3 | $f_2$ |
| F4 | $f_4$ |
| F5 | $f_8$ |

| RM | |
|---|---|
| FRAME | LO FREQ |
| F1 | $f_x$ |
| F2 | $f_x$ |
| F3 | $f_a$ |
| F4 | $f_c$ |
| F5 | $f_b$ |
| F6 | $f_b$ |
| F7 | $f_b$ |
| F8 | $f_t$ |
| F9 | $f_a$ |
| F10 | $f_a$ |
| F11 | $f_r$ |

ADVANCED WIRELESS COMMUNICATION SYSTEM INCORPORATING WIDEBAND FREQUENCY HOPPING

CROSS-REFERENCE TO RELATED APPLICATIONS

This application claims priority from U.S. Provisional Application No. 63/537,892, filed Sep. 12, 2023 and incorporated herein by reference.

TECHNICAL FIELD

This disclosure is directed to wireless communication systems and, more particularly, to systems utilizing a combination of frequency shifting and frequency hopping to enable use of more of the available frequency spectrum while also providing a secure signal path from transmitter to receiver.

BACKGROUND OF THE DISCLOSURE

Frequency-hopping spread-spectrum (FHSS) communication systems are known and used in many applications. In a traditional FHSS system, a transmitted signal rapidly changes frequencies (i.e., "hops" from one frequency to another) within a defined operating channel. The hopping follows a predefined sequence established by the transmitter. Frequency hopping helps to mitigate interference from other devices or radio signals operating within the same frequency band (typically a fixed frequency transmission). Inasmuch as a frequency-hopped transmission rapidly changes frequencies, it is less likely to be affected by on-going interference at any specific frequency. Additionally, frequency hopping can be thought of as a type of signal "scrambling" or encryption that enhances the security of the transmission link. Since the hopping sequence is known only to the transmitter and receiver, it is challenging for unauthorized devices to intercept the communication.

To date, frequency hopping techniques have typically been used in point-to-point communications. The relatively narrow band over which the hops occur allows for the transmitter and receiver to be configured to follow a predefined in-band hopping sequence using standard devices.

In view of the larger (and wider) number of frequency bands that are used to support wireless communications in wide area networks (WANs), frequency hopping has been seen as extremely difficult to implement, since the devices all need to be configured to transmit and receive over an extensive frequency range. Instead, these networks have developed other techniques, such as orthogonal frequency division multiplexing (OFDM), time division multiplexing (TDM) and the like to deliver the requisite volume of data throughput. As data rates continue to increase, however, various factors related to these multiplexed transmission systems become complicated and problematic. For example, as speed increases, the power consumption of the transmitter and receiver components increases as well, with an increase also seen in equipment cost and failure rate. In terms of performance, higher latency becomes a concern.

SUMMARY OF THE INVENTION

This disclosure is directed to the provision of large-scale wireless network applications. In particular, a system of wireless communication is proposed that incorporates frequency hopping into the applicant's previously-developed frequency-shifted wireless systems. Applicant's previous work (including issued US patents, identified below) is directed to opening up RF communications to a larger frequency spectrum by the use of heterodyning techniques (including a local oscillator operating at a defined frequency) to shift an RF transmission to an intermediate frequency (IF) based upon the combination of the RF and LO frequency values.

In accordance with the principles of the present invention, the applicant's previously-developed frequency shifting techniques for utilizing more of the available frequency spectrum is now further improved by incorporating frequency hopping with the frequency shifting process. Frequency hopping may be defined in this context as periodically changing the LO or IF frequencies used in the heterodyne process for frequency shifting. Advantageously, the frequency hops may cover a relatively wide range of available frequency bands, adding a level of noise mitigation that may be associated with certain frequencies within a given band. By its nature, the addition of frequency hopping frustrates the ability of outsiders to access transmissions, essentially encrypting transmitted (and received) messages by the multiple changes in frequency over time.

It is to be understood that a paired transmitter and receiver need to follow the same frequency hopping sequence in order to properly recover a transmitted message. A "map" of frequencies to be used, as well as a dwell time for each frequency, may be delivered to both the transmitter and receiver via a separate command/control signal path. Alternatively, a transmitter may develop the map and forward it to the receiver. The frequency hopping sequence is preferably a randomly-generated sequence that uses the entire available frequency range. As noted below, a created frequency sequence map may be dynamic in terms of controlling the use (or avoidance) of specific frequencies based on network conditions.

Frequency hopping may be deployed in a variety of various network environments, such as multi-channel wireless transceiver, in a point-to-multipoint architecture, or in an ad hoc mesh configuration, as may be deployed in a wireless network embodiment.

The frequency hopping may be implemented so that the assigned frequency changes occur at fixed points in transmission (e.g., frequency change after M frames are transmitted), or the changes may be random (which adds to the security of the system). In one embodiment, the identity of a "next frequency" is included in header information sent from the transmitter to the receiver, so that there is no need to maintain a synchronous clock between the transmitter and receiver.

An exemplary embodiment may take the form of a frequency-hopping wireless communication system including frequency-hopping wireless communication system including a frequency hopping sequence generator configured to create a hopping sequence map M1 of available LO frequencies across a wideband frequency range, a wireless transmitter, and a wireless receiver. The wireless transmitter is configured to include a frequency synthesizer configured to generate a predefined LO frequency signal in response to a control signal defining a specific LO frequency, a frequency controller responsive to the sequence map M1 created by the frequency hopping sequence generator and providing as an output the control signal to the frequency synthesizer to as to control the LO frequency signal generated by the frequency synthesizer to follow the hopping sequence and thereby change the created LO frequency as a function of time, a mixer receiving, as separate inputs, a communication signal for transmission across the frequency-hopping wireless communication system and the frequency-hopped LO signal, the mixer configured combine the input signals and generate therefrom a frequency-hopped RF signal related thereto, an adjustable bandpass filter positioned at the output of the mixer and configured to pass only a small band around a center frequency of the frequency-hopped RF signal, wherein the center frequency of the adjustable bandpass filter is controlled by the frequency controller, and an antenna system for converting the filtered, frequency-hopped RF signal into a frequency-hopped wireless communication signal for transmission to the remotely-located wireless receiver. The remotely-located wireless receiver is formed to include an antenna system for receiving the frequency-hopped wireless communication signal from the wireless transmitter, a frequency synthesizer configured to create a defined LO frequency signal in response to a control signal applied as an input thereto, a frequency controller responsive to the frequency-hopping sequence map utilized by the wireless transmitter M1 and provide as an output the control signal for the frequency synthesizer so as to control the LO frequency signal generated by the frequency synthesizer to follow the hopping sequence of the sequence map and thereby change the created LO frequency as a function of time, a mixer receiving as inputs the incoming frequency-hopped wireless communication signal and the frequency-hopped LO signal from the receiver frequency synthesizer, the mixer configured to combine the inputs and produce therefrom a baseband version of the transmitted communication signal, and a bandpass filter disposed to receive the output from the mixer and configured to pass only a small frequency band around the baseband version to provide as an output the recovered communication signal.

Another embodiment of the present invention may take the form of a frequency-hopping wireless transceiver comprising a wireless transmit section responsive to an input communication signal and providing as an output a frequency-hopped wireless signal version thereof, a wireless receive section responsive to an incoming frequency-hopped wireless signal and providing as an output a recovered baseband communication signal related thereto, and a frequency hopping sequence generator configured to create a hopping sequence map M1 of available LO frequencies across a wideband frequency range. The wireless transmit section is formed to comprise a frequency synthesizer configured to generate a predefined LO frequency signal in response to a control signal defining a specific LO frequency, a frequency controller responsive to the sequence map M1 created by the frequency hopping sequence generator and providing as an output the control signal to the frequency synthesizer to as to control the LO frequency signal generated by the frequency synthesizer to follow the hopping sequence and thereby change the created LO frequency as a function of time, a mixer receiving, as separate inputs, the communication signal for transmission and the frequency-hopped LO signal, the mixer configured combine the input signals and generate therefrom a frequency-hopped RF signal related thereto, an adjustable bandpass filter positioned at the output of the mixer and configured to pass only a small band around a center frequency of the frequency-hopped IF signal, wherein the center frequency of the adjustable bandpass filter is controlled by the frequency controller, and an antenna system for converting the filtered, frequency-hopped RF signal into a frequency-hopped wireless communication signal for transmission. The receive section of the wireless transceiver is formed to include a receiver frequency synthesizer configured to create a defined LO frequency signal in response to a control signal applied as an input thereto, a frequency controller responsive to a receiver frequency-hopping sequence map utilized by a remotely-located wireless transmitter M2 and provide as an output the control signal for the frequency synthesizer so as to control the LO frequency signal generated by the frequency synthesizer to follow the receiver hopping sequence of the sequence map and thereby change the created LO frequency as a function of time, a mixer receiving as inputs the incoming frequency-hopped wireless communication signal and the frequency-hopped LO signal from the receiver frequency synthesizer, the mixer configured to combine the inputs and produce therefrom a baseband version of the received communication signal, and a bandpass filter disposed to receive the output from the mixer and configured to pass only a small frequency band around the baseband version to provide as an output the recovered version of the received signal.

The inclusion of frequency hopping in a specific multiple-input, multiple-output (MIMO) context is considered to be quite advantageous in that the "next frequency" is selected from over the wide frequency spectrum available for use. By virtue of opening up the possibilities of using frequency hops over such a wide range, the possibility of untoward detection (or jamming) is significantly decreased. Moreover, inasmuch as the transmit and receive portions of an individual radio may be using different hopping sequences, it becomes very difficult to "spoof" the system.

One exemplary aspect of the application of frequency hopping to the previously presented frequency-shifted capability may be used in any FDD or TDD wireless system (e.g. LTE, Wi-Fi or 5G/6G). The transmitted signal may change (hop) frequencies in a random sequence through the control of included frequency synthesizers to change the LO frequency (or by changing the IF frequency from the modem). The transmitter and associated receiver synchronize the random channel map at the power up time (and perhaps periodically thereafter) to ensure that all radios in the network are using a unique sequence. The channel map includes information about the next hop frequency and perhaps the dwell time to use at the start of the next frame. Thus, the channel map eliminates the need to precisely synchronize the transmitter and the receiver of each radio in the network.

Advantageously, the "next" frequency to be used is selected from a large spectrum of a multiple bands (i.e. not limited to the current operating band). Transmission spread over a wide frequency range minimizes the probability of jamming and detection. Further, the utilization of a random next frequency and dwell time selection increases the resilience to jamming and detection, all in accordance with the principles of the present invention.

Other and further advantages and embodiments and features of the present invention will become apparent during the course of the following discussion and by reference to the accompanying drawings.

BRIEF DESCRIPTION OF THE DRAWINGS

Referring now to the drawings.

DETAILED DESCRIPTION

The principles of the present invention, as described in detail below, are directed to the implementation of frequency hopping in wireless communication systems in a manner that allows for the individual hops to take place across the wide (and relatively unused) frequency range available for wireless communication. A given hopping sequence is preferably generated as a random sequence, creating a unique frequency hopping map that is known by only a designated transmitter-receiver pair for an individual communication session. Applicant's previous work in the provision of frequency shifting for wireless communications (see, for example, U.S. Pat. No. 10,498,371 issued on Dec. 3, 2019 and assigned to the assignee of this invention) is based on the use of heterodyning a frequency-synthesized local oscillator (LO) and an input communication signal, and provides the basis for the application of frequency hopping, as described in detail below.

Figure 1:
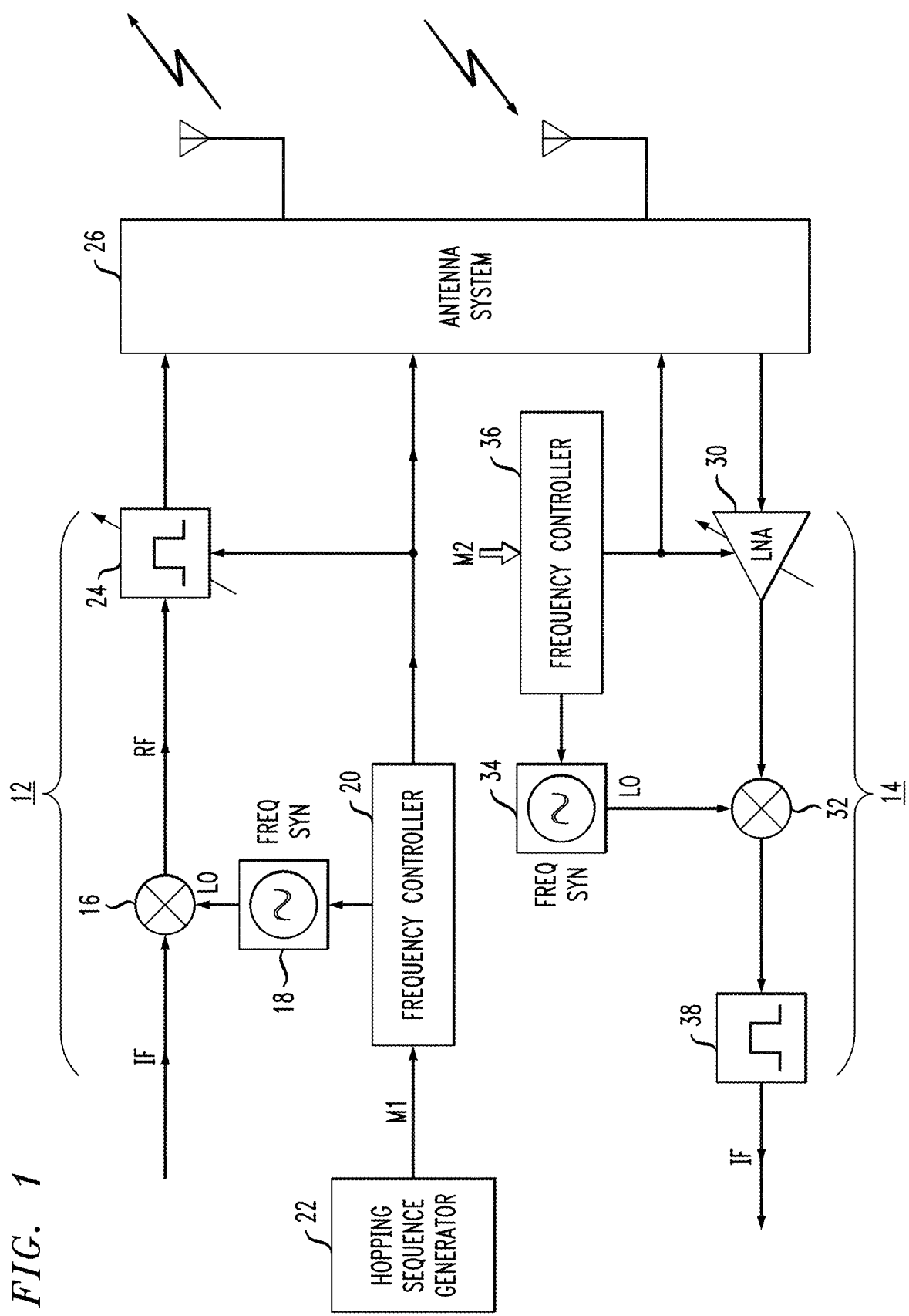
FIG. 1 is a simplified block diagram of an exemplary wireless transceiver formed to utilize frequency hopping in accordance with the principles of the present invention.

FIG. 1 is a simplified block diagram of an exemplary wireless transceiver 10 formed in accordance with the teachings of the present invention to provide frequency-hopped transmission (and reception) of wireless signals. Wireless transceiver 10 is shown as including a transmit section 12 and a receive section 14.

Referring now to transmit section 12 of transceiver 10, an input signal IF from a conventional wireless device) supplied as a first input to a mixer 16, with a local oscillator (LO) signal used as the second input to mixer 16. The LO signal is provided by a frequency synthesizer 18 that is able to generate an oscillating output operating at any desired frequency value. In accordance with the principles of the present invention and described in detail below, by virtue of using a frequency synthesizer to create the mixing signal, it is possible to provide the series of different, random LO frequencies required to perform frequency hopping on the IF input signal. Indeed, the use of a frequency synthesizer opens up the spectrum of available frequencies to be used for this purpose (e.g., anywhere within the spectrum from 10 MHz to 100,000 MHz). Alternatively, the frequency hopping may be applied to the incoming IF signal instead of the LO signal. For the sake of discussion, the hopping will be described below as used with the LO input, with the understanding that the same principles apply to the IF input.

Figure 2:
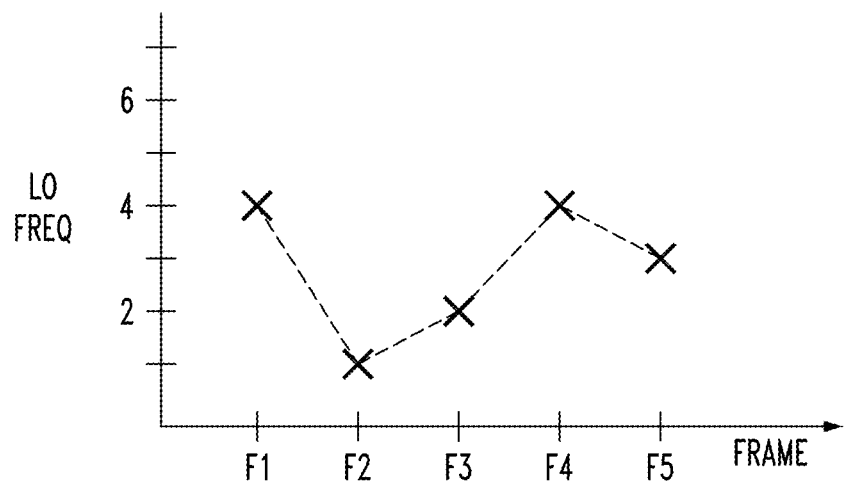
FIG. 2 contains two example maps of frequency hopping sequences, for illustrative purposes of understanding the principles of the present invention, as well as a graph illustrating the frequency hopping as a function of time (as measured by frames transmitted)

In accordance with the principles of the present invention, a frequency controller 20 and a hopping sequence generator 22 are used in combination with LO frequency synthesizer 18 to perform frequency hopping on the IF input signal (or vice versa). FIG. 2 contains simplified diagrams illustrating the application of frequency hopping, where it is presumed in this example that the LO frequency is changed for each frame that is transmitted. A hopping sequence map M1 is depicted as identifying a randomly-selected LO frequency to be used as an input to mixer 16. In particular, M1 shows the relationship between the frame of the IF input message and the LO frequency to be used for that frame. A graph depicting this use of different LO frequencies as a function of time is also shown in FIG. 2, illustrating the "hopping" of the transmitted frames from using one frequency to the next.

It is also possible that further randomness may be added to the transmission by also changing the LO frequency at random points in time instead of the per-frame arrangement as shown in map M1. For example, map RM in FIG. 2 illustrates this use of a random "dwell time" for each LO frequency (dwell time measured in this case as a function of the number of frames to be transmitted using the same LO frequency). In general, as long as a paired transmitter and receiver are utilizing the same hopping sequence map, the receive is able to accurately recover the transmitted signal (the frequency hopping reducing transmission errors associated with noise and/or poor signal quality at certain frequencies, as well as frustrating unwanted third parties from accessing the transmitted message).

Returning to the description of wireless transceiver 10 of FIG. 1, hopping sequence generator 22 of transmit section 12 is used to create a hopping sequence map, such as map M1 shown in FIG. 2, of a random selection of LO frequencies to be used. Hopping sequence generator supplies the sequence of randomly-generated specific frequency values to frequency controller 20. In turn, frequency controller 20 sends an instruction to frequency synthesizer 18 to create the "next" LO frequency to be used as an input to mixer 16.

As a result of changing the LO frequency (perhaps on a frame-by-frame basis or, alternatively, on a random basis as illustrated by map RM of FIG. 2), the center frequency of the RF output from mixer 16 changes as well.

In order for a band-limited output signal to be created by transmit section 12, a bandpass filter 24 is shown as positioned at the output of mixer 16. Moreover, bandpass filter 24 must be a tunable device having an adjustable center frequency that spans the possible frequency spectrum that may be generated by frequency hopping. Therefore, as shown in FIG. 1, frequency controller 20 also provides the frequency values associated with map M1 as an input to bandpass filter 24 so that its center frequency will track with the changes produced by frequency synthesizer 18. A control output from frequency controller 20 is also applied to antenna system 26, so that tuning may take place prior to the RF transmission of the frequency-hopped version of the original input signal.

Figure 3:
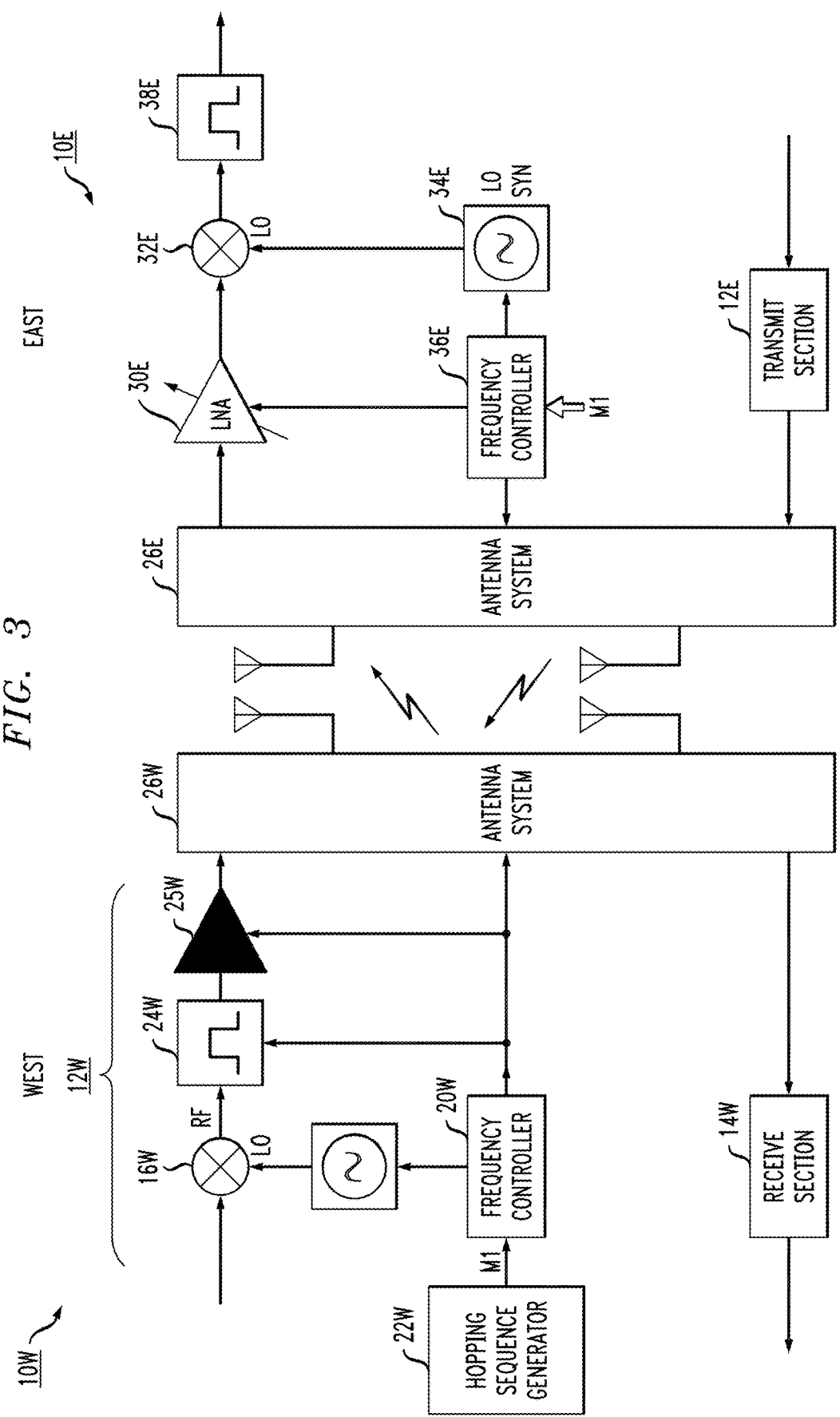
FIG. 3 illustrates an exemplary implementation of the inventive principles when used with a wireless transmitter-receiver pair.

As will be discussed below in association with FIG. 3, a remotely-located receiver needs to utilize this same frequency hopping map M1 in order to properly recover the original data signal from the received frequency-hopped RF signal.

Continuing with the discussion of FIG. 1, receive portion 14 of wireless transceiver 10 functions in a manner similar transmit section 12 so as to be able to convert a frequency-hopped received signal back into a recovered baseband signal. The incoming signal is first captured by antenna system 26 and converted into an electrical version. The received signal is then applied as an input to a low noise amplifier (LNA) 30 to preferentially boost the power of the current center frequency (that is, associated with the relevant frequency hopping sequence) with respect to any other spurious signal (noise) outside of small band surrounding $R_{in}$ (i.e., improving the signal-to-noise ratio for the received signal, which is typically of relatively low power).

The output from LNA 30 is then applied as a first input to a mixer 32, with a second input to mixer 32 being a frequency synthesizer 34. In the exemplary embodiment of FIG. 1, a frequency controller 36 is included in receive portion 14 of wireless transceiver 10 and is used to send instructions to frequency synthesizer 34 with respect to the sequence of frequency values to be used as the LO input. For proper operation of receive section 14, the receive signal path must use the same frequency hopping sequence map that is used by a remotely-located transmitter (not shown) to create the frequency-hopped message in the first place. For the purposes of discussion, it will be presumed that a hopping sequence map M2 was used by the remote transmitter. There are various ways that hopping sequence map M2 may be provided to receive portion 14, as will be discussed in detail below. For present purposes, frequency hopping sequence map M2 is merely shown in FIG. 1 as applied as an input to frequency controller 36.

Applying the same logic as discussed above in association with transmit portion 12, the particular hopping sequence map M2 used in receive portion 14 needs to control the operation of LNA 30, so that the primary frequency being amplified properly tracks the hopping sequence. Similarly, antenna 26 needs to be continuously tuned to receive the proper frequency as well.

It is to be recalled that previous implementations of FHSS systems were somewhat limited by the expense and complexities associated with the ability to handle multiple frequencies. Here, however, by implementing frequency hopping through the use of frequency synthesizers 18, 34, a configuration is provided that allows for frequency hopping over a wide frequency range to be implemented in a system without extremes in additional cost or complexity. Indeed, it is contemplated that a frequency range spanning between 10 MHz and 100,000 MHz may be used as a source for randomly-selected LO frequency hopping values.

As mentioned above, in order for a frequency-hopped transmission to be properly recovered, the receiver needs to follow the same hopping sequence as used by the transmitter. FIG. 3 illustrates this process, using a pair of transceivers 10, designated as "10 West" (10W) and "10 East" (10E). In this particular embodiment, transmit section 12W further includes a power amplifier 25W disposed beyond the output of bandpass filter 24W and used to further amplify the signal in the filtered region around the defined center frequency. As with bandpass filter 24W, power amplifier 25W is a tunable device and controlled by frequency controller 20W in order to maintain its center frequency (associated with amplification) in synch with the frequency-hopping sequence used to generate the IF signal to be transmitted.

For the sake of discussion, it will be presumed that a wireless transmission is in progress between transmit section 12W of transceiver 10W and receive section 14E of transceiver 10E, the transmission based on the hopping sequence map M1 as discussed above. Therefore, in order for receive section 14E to properly recover this transmission, mixer 32E must use the same hopping sequence as its LO input. Map M1 is thus shown as the input to frequency controller 36E of receive portion 14E. Frequency controller 36E (using map M1) tunes antenna system 26E is properly receive the incoming frequency-hopped signal $S_{out}$, and also adjusts the center frequency being amplified by LNA 30E.

The output from LNA 30E is then applied as a first input to mixer 32E, with the second input to mixer 342 being frequency synthesizer 34E, which is controlled by instructions from frequency controller 36E (again, using hopping sequence map M1). As discussed above, the map used by transmit section 12W (here, map M1) has previously been communicated to receive section 14E. The IF output from mixer 32E then passes through bandpass filter 38E to recover the transmitted message signal.

Figure 4:
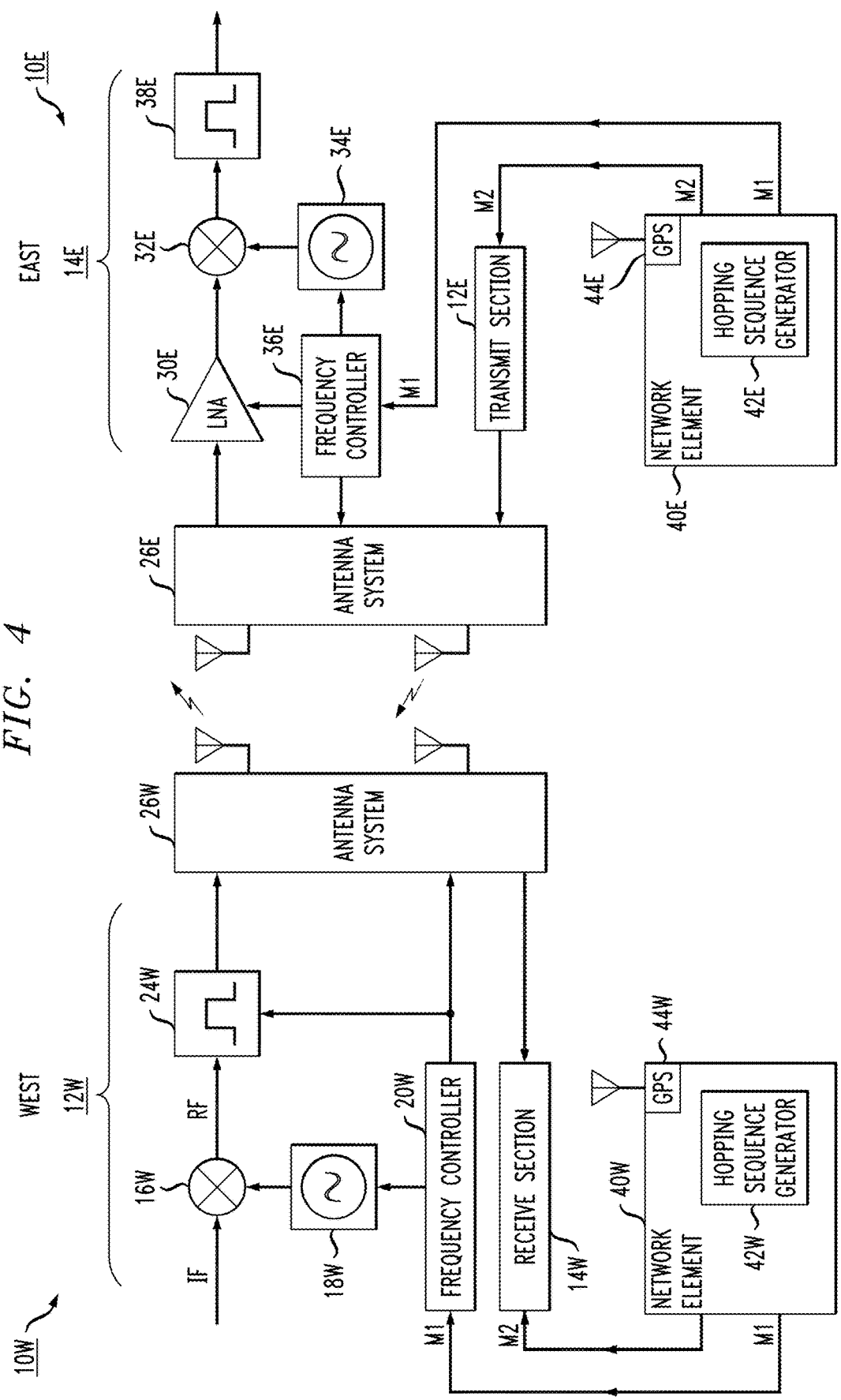
FIG. 4 shows another configuration of the embodiment of FIG. 3, in this case using a network-based element to create frequency-hopping sequence maps and provide them to appropriate network wireless transceivers.

FIG. 4 is a block diagram illustrating an exemplary configuration that may be used to generate the random frequency hopping sequence maps that are used to control communications in accordance with the principles of the present invention. FIG. 4 illustrates wireless transceivers 10W and 10E, as discussed above in association with FIG. 3. However, in this case, transmit portion 12W of transceiver 10W does not include a hopping sequence generator. Instead a network element 40W is used to create frequency hopping sequence maps and provide them to wireless transceiver 10W. Similarly, a network element 40E provides frequency hopping sequence maps to wireless transceiver 10E. In this example, each network elements 40W and 40E is shown as including a hopping sequence generator (designated as 42W and 42E, respectively) that creates all of the randomly-selected frequency hopping sequences to be used, with network elements 40W, 40E configuring the maps from this information and communicating them to transceivers 10W and 10E. By virtue of using a network-based component, the assurance that each randomly-generated sequence is unique. Here, network element 40W is shown as providing generated map M1 to transmit section 12W and map M2 to receive section 14W. Each network element 40 is shown as further comprising a GPS component 44, which may be used to synchronize their sequence generators 42.

In some embodiments, network element 40 may have access to information with respect to the quality of transmission at certain frequencies, which may change over time. This information may be passed along to sequence generator 42 and used during the generation of a following sequence to avoid having a transmission include a "bad" frequency in the hopping sequence, the avoidance of bad LO frequencies contemplated as decreasing the chance of failed transmissions. The use of random frequency selection, as well as random dwell time (i.e., randomizing the number of frames transmitted with a particular hop frequency), in accordance with the present invention, is contemplated as increasing the resilience of the transmitted signals to jamming and/or detection by non-designated receivers.

Figure 5:
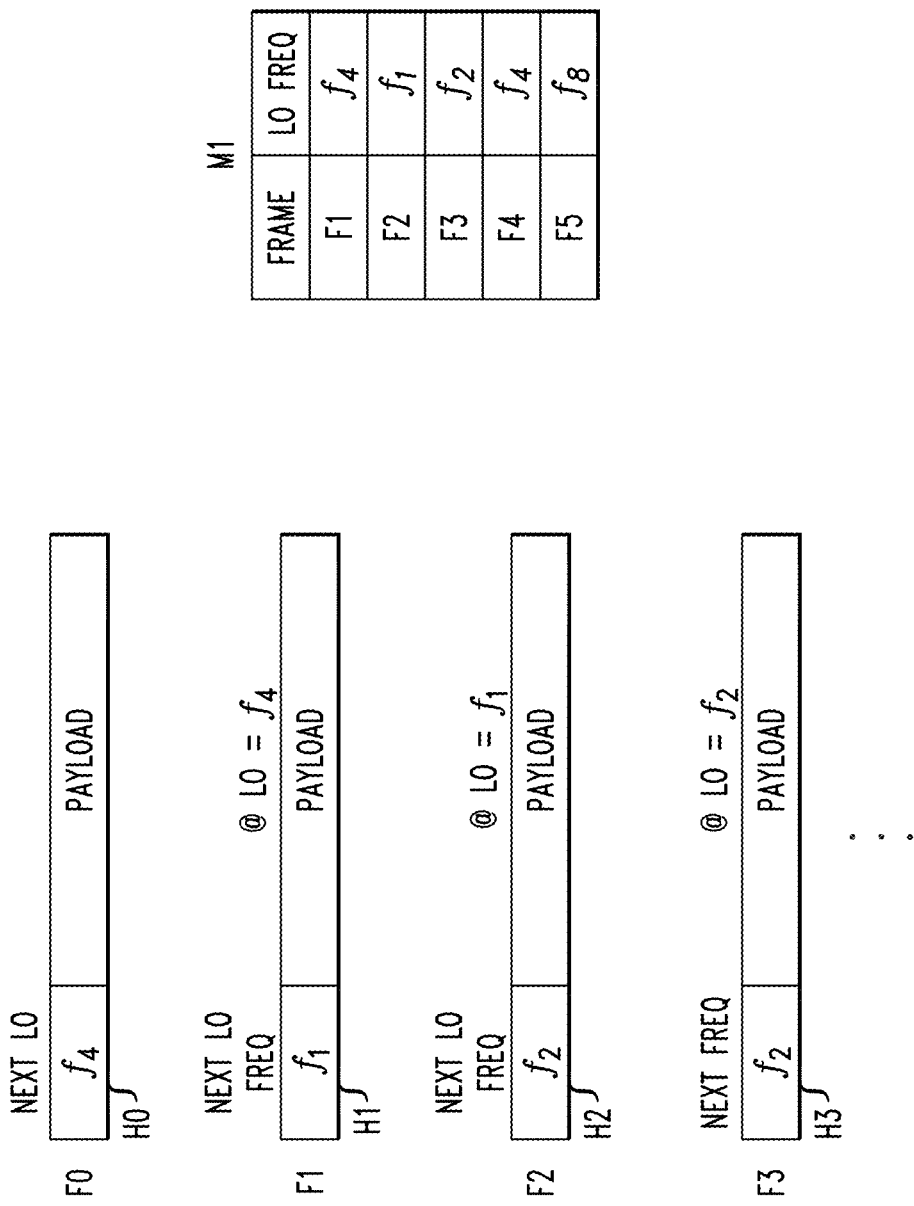
FIG. 5 depicts the transmission of several frequency-hopped frames, with the identity of a following hop value included in the prefix of a previous frame.

In another implementation of providing the unique frequency hopping sequence from a transmitter to a designated receiver, the identity of the "next" frequency to be used in a defined sequence may be included within a control information portion (e.g., header) of a current frame being transmitted. This methodology is illustrated in FIG. 5, which depicts the transmission of several frames in sequence (F1, F2, . . . ). The ability to transmit this frequency hopping information within the frame eliminates the need to maintain synchronization between the transmitter and receiver, or require the use of a network element to provide the frequency hopping maps.

In the particular arrangement as shown in FIG. 5, it is presumed that an initial default frame F0 uses a default (start-up) LO frequency. When assembling frame F0 for transmission, a "next frequency" indicator in its header portion H0 is set to the first frequency hop defined in map M1 (i.e., $f_4$). Thus, the following frame F1 will use $f_4$ as its LO frequency. The process follows in a like manner, with header portion H1 of frame F1 including information for the next hop frequency; that is $f_1$, as per map M1.

While the above discussion has referenced the use of frequency hopping in a wireless transmitter-receiver pair, it is to be understood that frequency hopping may be incorporated within any wireless transmission system that utilizes frequency shifting, such as described in several of the applicant's previously-issued patents, including the patents referenced above.

Figure 6:
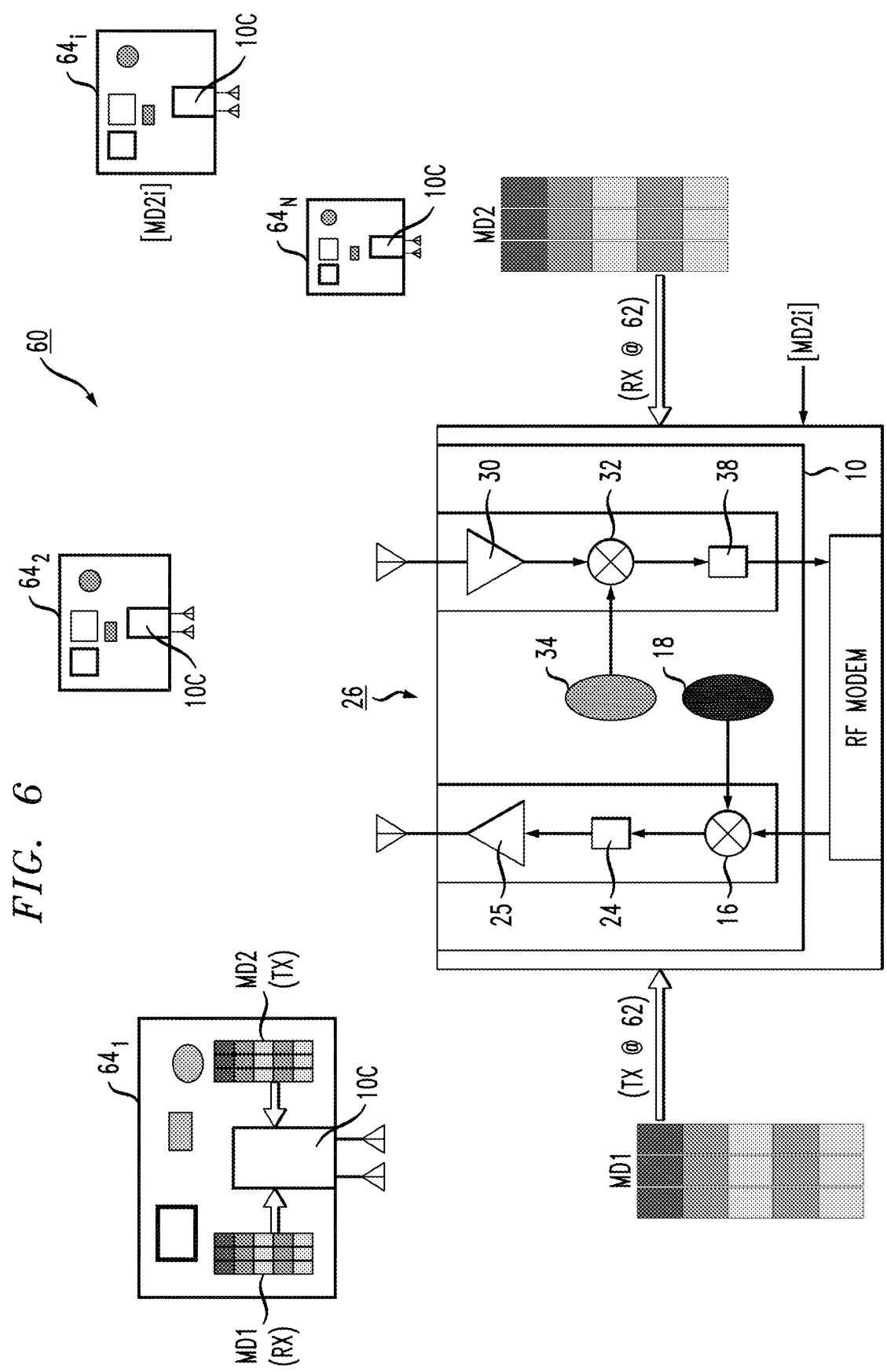
FIG. 6 is a simplified diagram of a private network architecture utilizing frequency hopping in accordance with the present invention.

For example, FIG. 6 is a simplified diagram of a private network architecture 60 employing frequency hopping in accordance with the teachings of the present invention. A master device 62, which may be at a fixed location, includes a transceiver 10 employing frequency hopping as described above in association with FIG. 1, with the same reference numerals used to define the same elements. In this embodiment, master device 62 is in communication with a plurality of client devices 64, with each client device having a similar frequency hopping transceiver, shown here as 10c. The communications between master device 62 and client devices 64 is typically a "one-to-many" broadcast mode from the master device, with the individual client devices responding. However, it is contemplated that from time to time, various ones of client devices 64 may form an ad hoc mesh network to directly share communications.

The addition of frequency hopping in accordance with the principles of the present invention, therefore, relies on all of the transceivers using the same frequency hopping sequence, as supplied by a random hopping sequence generator 66. In this particular arrangement master device 62 uses a first map MD1 as its transmit hopping sequence, and therefore all of the receive sections 14 in client devices 64 must use this same map MD1 to properly recover the transmitted message. In the other direction, it is presumed that all client devise 64 use the same transmit hopping sequence, which is defined here as following a hopping sequence map MD2. Thus, master device 62 is required to utilize map MD2 as its receive hopping sequence map in order to properly recover transmissions from the individual client devices 64. It is also possible that each individual client device 64i uses its own transmit hopping sequence map (i.e., MD2i), where in that case master device 62 includes a plurality of receive hopping sequence maps and selects the proper map to use based on the identity of the particular client device sending a transmission.

Taken a step further, client-to-client communications may utilize yet a different frequency hopping sequence (established by a designated node in the ad hoc mesh network network).

FIG. 7 illustrates, again in simplified form, an N-channel MIMO transceiver 70 that may also use frequency hopping in accordance with the teachings of the present invention. In contrast to prior art multi-channel MIMO configurations where each channel is assigned its own (limited) frequency band to use for transmissions, the addition of frequency hopping allows for all channels to make use of the complete, wide frequency band available for wireless communication. This is considered as a significant advance, both in terms of expanding the set of frequencies available for each channel as well as improving the security of the individual communication links.

Figure 7:
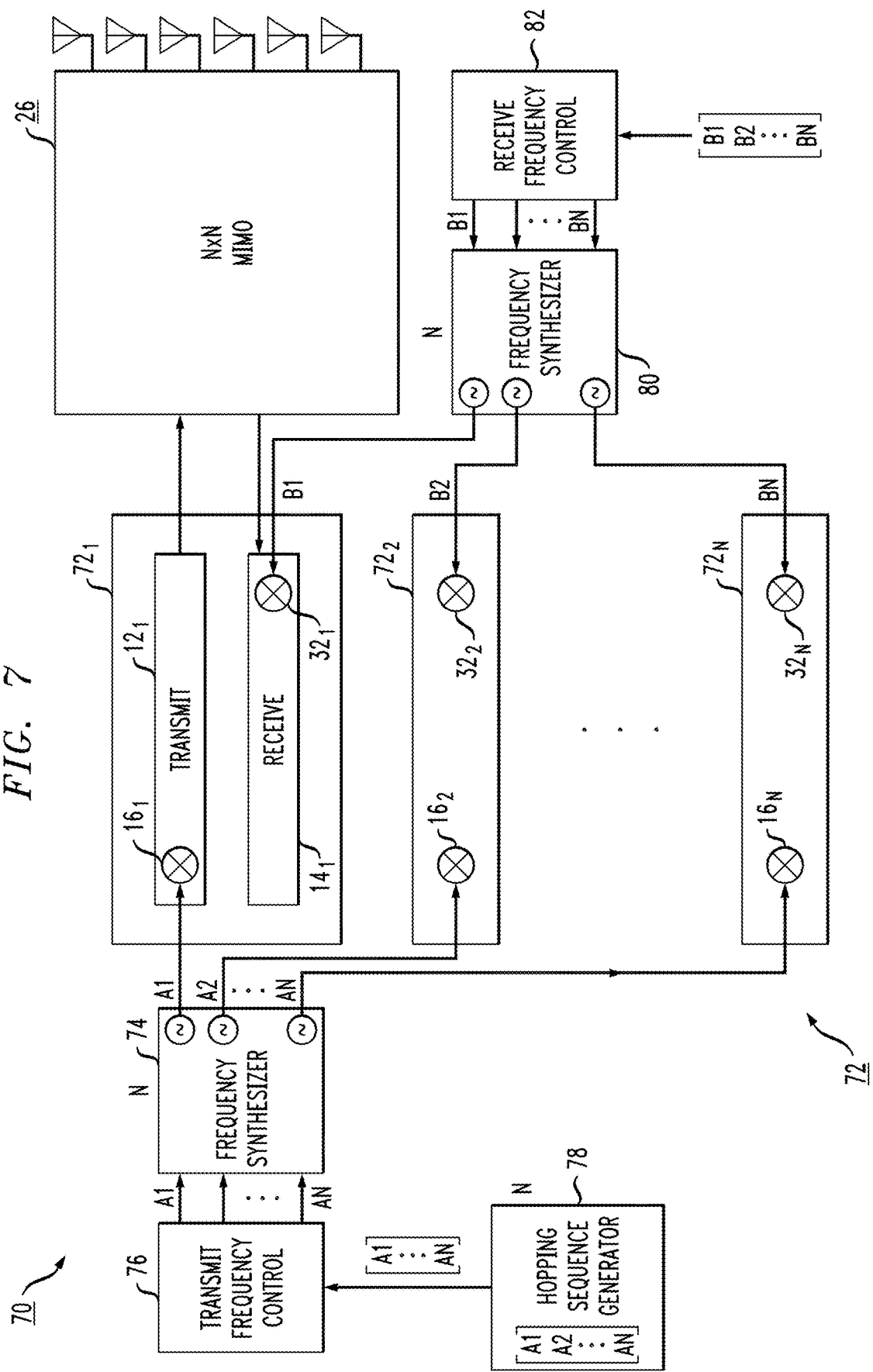
FIG. 7 illustrates a diagram of an exemplary N-channel MIMO wireless transceiver utilizing frequency hopping in accordance with the principles of the present invention.

As shown in FIG. 7, system 70 includes a plurality of N individual channels 72 that may be used to support MIMO communication, where each channel $72_i$ including a transmit section $12_i$ and a receive section $14_i$, similar in form and function to transmit section 12 and receive section 14 as discussed above. The use of frequency hopping is illustrated in this embodiment by the presence of transmit mixers $16_1$-$16_N$ and receive mixers $32_1$-$32_N$ in channels $72_1$-$72_N$, respectively. Channel $72_1$ explicitly indicates the presence of transmit section $12_1$ and receive section $14_1$; for the sake of clarity, the remaining channels do not particularly illustrate this detail.

In this embodiment, a transmit LO frequency synthesizer 74 is configured to provide a set of N separate LO frequency inputs to mixers $16_1$-$16_N$ of transmit sections $12_1$-$12_N$, based on commands supplied by a transmit frequency controller 76. An included frequency hopping sequence generator 78 is shown as creating a set of transmit hopping sequence maps A1-AN that are provided to transmit frequency controller 76. A separate transmit hopping sequence is utilized, as shown, as the LO input to each mixer $16_1$-$16_N$, respectively.

A receive LO frequency synthesizer 80 is similarly used to provide a set of N separate LO frequency inputs to mixers $32_1$-$32_N$ of receive sections $14_1$-$14_N$ of channels $72_1$-$72_N$, based on commands from receive frequency controller 82. As discussed above, receive frequency controller 82 is supplied with hopping sequence maps B1-BN via any suitable means (e.g., directly sent from remotely-located transmitters, using next-hop information in the header portion of a received frame, supplied from a network element, etc.). Again, a separate receive hopping sequence is utilized as the LO input to each mixer $32_1$-$32_N$.

The inclusion of frequency hopping in the MIMO context is therefore quite advantageous in that the "next frequency" is selected from over the wide frequency spectrum available for use. By virtue of opening up the possibilities of using frequency hops over such a wide range, the possibility of untoward detection (or jamming) is significantly decreased. Moreover, inasmuch as the transmit and receive portions of an individual radio may be using different hopping sequences, it becomes very difficult to "spoof" the system. Additionally, when utilized in a Carrier Sense Multiple Access with Collision Avoidance (CSMA/CA) system, the transceiver may disable its Clear Channel Assessment (CCA) in a high interference environment to avoid having its transmission being shut down. The radio can use AES256 encryption for inter-node messaging to prevent hacking. The radio can use beam steering to increase its immunity to potentially jamming of the transmission frequency by outsiders. The radio can lower the transmitter power to maintain a good link quality and high modulation rates. Reduction of transmitter power is further considered to reduce the possibility of detection. High modulation rate makes the packet transmission time short and hence reduces the possibility of detection. The radio can go into complete silence mode for a specified period of time or until it receives the wake up command to avoid detection Summarizing, the application of frequency hopping to the previously presented frequency-shifted capability may be used in any FDD or TDD wireless system (e.g. LTE, Wi-Fi or 5G/6G). The transmitted signal may change (hop) frequencies in a random sequence through the control of included frequency synthesizers to change the LO frequency (or by changing the IF frequency from the modem). The transmitter and associated receiver synchronize the random channel map at the power up time (and perhaps periodically thereafter) to ensure that all radios in the network are using a unique sequence. The channel map includes information about the next hop frequency and perhaps the dwell time to use at the start of the next frame. Thus, the channel map eliminates the need to precisely synchronize the transmitter and the receiver of each radio in the network.

Advantageously, the "next" frequency to be used is selected from a large spectrum of a multiple bands (i.e. not limited to the current operating band). Transmission spread over a wide frequency range minimizes the probability of jamming and detection. Further, the utilization of a random next frequency and dwell time selection increases the resilience to jamming and detection, all in accordance with the principles of the present invention.

While the present invention has been described with respect to a limited number of embodiments, those skilled in the art will appreciate numerous modifications and variations that may be related thereto. It is intended that the appended claims cover all such modifications and variations so as to fall within the true spirit and scope of the present invention.

What is claimed is:

1. A frequency-hopping wireless communication system, comprising:
   a frequency hopping sequence generator configured to create a hopping sequence map M1 of available local oscillator (LO) frequencies across a wideband frequency range;
   a wireless transmitter, including:
      a frequency synthesizer configured to generate as an output a predefined LO frequency signal in response to a control signal defining a specific LO frequency;
      a frequency controller responsive to the hopping sequence map M1 created by the frequency hopping sequence generator and providing as an output the control signal to the frequency synthesizer so as to control the output generated by the frequency synthesizer to follow a hopping sequence and thereby change the predefined LO frequency signal as a function of time;
      a mixer receiving, as separate inputs, a communication signal for transmission across the frequency-hopping wireless communication system and the predefined LO frequency signal generated by the frequency synthesizer, the mixer configured to combine the communication signal and the predefined LO frequency signal and generate therefrom a frequency-hopped radio frequency (RF) signal related thereto;
      an adjustable bandpass filter positioned at the output of the mixer and configured to pass only a defined band around a center frequency of the frequency-hopped RF signal, wherein the center frequency of the adjustable bandpass filter is controlled by the frequency controller; and
      an antenna system for converting the output from the adjustable bandpass filter into a frequency-hopped wireless communication signal for transmission by the wireless transmitter; and
   a remotely-located wireless receiver, including:
      an antenna system for receiving the frequency-hopped wireless communication signal sent by the wireless transmitter and converting into a received frequency-hopped RF communication signal;
      a frequency synthesizer configured to generate a receiver LO frequency signal in response to a control signal applied as an input thereto;
      a frequency controller responsive to the hopping sequence map M1 and providing as an output the control signal provided to the frequency synthesizer so as to control a LO frequency value of the receiver LO frequency signal to follow the hopping sequence map M1;
      a mixer receiving as inputs the received frequency-hopped RF communication signal and the receiver LO frequency signal, the mixer configured to combine the received frequency-hopped RF communication signal and the receiver LO frequency signal and produce as an output therefrom a baseband version of the transmitted communication signal; and
      a bandpass filter disposed to receive the output from the mixer and configured to pass only a defined frequency band around the baseband version of the transmitted communication signal, providing as an output of the remotely-located wireless receiver a recovered communication signal;
   wherein the frequency hopping sequence generator comprises a network element disposed separately from the wireless transmitter, the frequency hopping sequence generator configured to transmit the hopping sequence map M1 to both the wireless transmitter and the remotely-located wireless receiver and the network element further comprises a GPS component to provide frequency hopping sequence synchronization between the wireless transmitter and the remotely-located wireless receiver.

2. The frequency-hopping wireless communication system as defined in claim 1, wherein the frequency hopping sequence generator utilizes a random function to select individual LO frequencies for the hopping sequence map M1.

3. The frequency-hopping wireless communication system as defined in claim 1, wherein the frequency hopping sequence generator creates the hopping sequence map M1 such that individual LO frequency values change at fixed intervals by frame or time.

4. The frequency-hopping wireless communication system as defined in claim 1, wherein the frequency hopping sequence generator creates the hopping sequence map M1 by randomly changing individual LO frequency values as a function of frame or time.

5. The frequency-hopping wireless communication system as defined in claim 1, wherein the frequency hopping sequence generator is responsive to signal integrity feedback from the remotely-located wireless receiver and eliminates certain LO frequencies from use in creating updated versions of the hopping sequence map M1.

6. The frequency-hopping wireless communication system as defined in claim 1, wherein the wireless transmitter further comprises a controllable power amplifier disposed at the output of the adjustable bandpass filter and responsive to an output from the frequency controller of the wireless transmitter to provide amplification of the output from the adjustable bandpass filter prior to transmission by the antenna system.

7. The frequency-hopping wireless communication system as defined in claim 1, wherein the remotely-located wireless receiver further comprises a controllable low noise amplifier disposed to amplify the received frequency-hopped RF communication signal prior to input to the mixer.

8. The frequency-hopping wireless communication system as defined in claim 1, wherein the frequency hopping sequence generator is included as a component within the wireless transmitter.

9. A frequency-hopping wireless transceiver comprising
   an antenna system for transmitting and receiving frequency-hopped wireless signals;
   a wireless transmit section responsive to an input communication signal and providing as an output a frequency-hopped wireless signal version thereof;
   a wireless receive section responsive to an incoming frequency-hopped wireless signal for converting into an incoming frequency-hopped radio frequency (RF)

signal and providing as an output a recovered baseband communication signal related thereto, and a frequency hopping sequence generator configured to create a transmit hopping sequence map M1 of available local oscillator (LO) frequencies across a wideband frequency range and a receive hopping sequence map M2 of available LO frequencies across the wideband frequency range, wherein the transmit hopping sequence map M1 is different from the receive hopping sequence map M2, and wherein the wireless transmit section comprises a frequency synthesizer configured to generate as an output a predefined LO frequency signal in response to a control signal defining a specific LO frequency;

a frequency controller responsive to the transmit hopping sequence map M1 created by the frequency hopping sequence generator and providing as an output the control signal to the frequency synthesizer so as to control the output generated by the frequency synthesizer to follow a hopping sequence and thereby change the predefined LO frequency signal as a function of time;

a mixer receiving, as separate inputs, the input communication signal and the predefined LO frequency signal generated by the frequency synthesizer, the mixer configured to combine the input communication signal and the predefined LO frequency signal and generate therefrom a frequency-hopped RF signal related thereto; and an adjustable bandpass filter positioned at the output of the mixer and configured to pass only a defined band around a center frequency of the frequency-hopped RF signal, wherein the center frequency of the adjustable bandpass filter is controlled by the frequency controller, the output from the adjustable bandpass filter thereafter transmitted by the antenna system as a frequency-hopped wireless communication signal; and the wireless receive section comprises a receive frequency synthesizer configured to create as an output a defined receive LO frequency signal in response to a control signal applied as an input thereto;

a frequency controller responsive to the receive hopping sequence map M2 created by the frequency hopping sequence generator and providing as an output the control input to the receive frequency synthesizer so as to control the output generated by the receive frequency synthesizer to follow the receive hopping sequence map M2 and thereby change the defined receive LO frequency signal as a function of time;

a mixer receiving as inputs the incoming frequency-hopped RF signal received by the antenna system and the defined receive LO frequency signal created by the receive frequency synthesizer, the mixer configured to combine the incoming frequency-hopped RF signal and the receive LO frequency signal and produce as an output therefrom a baseband version of incoming frequency-hopped RF signal; and a bandpass filter disposed to receive the output from the mixer and configured to pass only a defined frequency band around the baseband version of the incoming frequency-hopped RF signal, providing as an output a recovered version the incoming frequency-hopped wireless signal.

10. The frequency-hopping wireless transceiver as defined in claim 9, wherein the frequency hopping sequence generator creates the transmit hopping sequence map M1 by utilizing random frequency assignments across the wideband frequency range.

11. The frequency-hopping wireless transceiver as defined in claim 9, wherein the frequency hopping sequence generator creates the transmit hopping sequence map M1 by changing the LO frequency at fixed time or frame intervals.

12. The frequency-hopping wireless transceiver as defined in claim 9, wherein the frequency hopping sequence generator creates the transmit hopping sequence map M1 by changing the LO frequency at random time or frame intervals.

13. The frequency-hopping wireless transceiver as defined in claim 9, wherein the wireless transmit section further comprises a controllable power amplifier disposed at the output of the adjustable passband filter, the controllable power amplifier responsive to an output from the frequency controller of the wireless transmit section to provide amplification of the output from the adjustable bandpass filter prior to transmission by the antenna system.

14. The frequency-hopping wireless transceiver as defined in claim 9, wherein the wireless receive section further comprises a controllable low noise amplifier disposed to amplify the incoming frequency-hopped RF communication signal prior to input to the mixer.

15. The frequency-hopping wireless transceiver as defined in claim 9, wherein the frequency hopping sequence generator is included as a component within the wireless transmit section.

16. The frequency-hopping wireless transceiver as defined in claim 9, wherein the frequency hopping sequence generator comprises a network element disposed separately from the wireless transmit section and the wireless receive section, the frequency hopping sequence generator configured to send the transmit hopping sequence map M1 to the frequency controller of the wireless transmit section and send the receive hopping sequence map M2 to the receive frequency controller of the wireless receive section.

17. A multiple input/multiple output (MIMO) frequency-hopping wireless transceiver comprising a plurality of N communication channels, where N is a cardinal number greater than one, each communication channel of the plurality of N communication channels comprising a wireless transmit section and a wireless receive section;

a transmit frequency hopping sequence generator for creating a plurality of N transmit hopping sequence maps A1-AN;

a transmit frequency controller responsive to the plurality of N transmit hopping sequence maps A1-AN and providing as an output a plurality of N control signals, each control signal of the plurality of N control signals provided as an input to a separate wireless transmit section of the plurality of N communication channels; and a receiver frequency controller responsive to a plurality of N receive hopping sequence maps B1-BN utilized by remotely-located wireless transmitters to creating a plurality of N incoming frequency-hopping wireless signals, wherein each wireless transmit section comprises a frequency synthesizer configured to generate as an output a predefined local oscillator (LO) frequency signal in response to a control signal defining a specific LO frequency;

a frequency controller responsive to a received transmit hopping sequence map Ai selected from the plurality of transmit hopping sequence maps A1-AN, created by the transmit frequency hopping sequence generator and providing as an output the control signal to the frequency synthesizer so as to control the output generated by the frequency synthesizer to follow a hopping sequence and thereby change the predefined LO frequency signal as a function of time;

a mixer receiving, as separate inputs, an input communication signal and the predefined LO frequency signal generated by the frequency synthesizer, the mixer configured to combine the input communication signal and the predefined LO frequency signal and generate therefrom a frequency-hopped RF signal related thereto; and an adjustable bandpass filter positioned at the output of the mixer and configured to pass only a defined band around a center frequency of the frequency-hopped RF signal, wherein the center frequency of the adjustable bandpass filter is controlled by the frequency controller, the output from the adjustable bandpass filter thereafter transmitted by the antenna system as a frequency-hopped wireless communication signal; and the wireless receive section comprises a receive frequency synthesizer configured to create as an output a defined receive LO frequency signal in response to a control signal applied as an input thereto;

a frequency controller responsive to a selected receive hopping sequence map Bi from the plurality of N receive hopping sequence maps B1-BN created by the frequency hopping sequence generator and providing as an output the control input to the receive frequency synthesizer so as to control the output generated by the receive frequency synthesizer to follow the receive hopping sequence map M2 and thereby change the defined receive LO frequency signal as a function of time;

a mixer receiving as inputs the incoming frequency-hopped RF signal received by the antenna system and the defined receive LO frequency signal created by the receive frequency synthesizer, the mixer configured to combine the incoming frequency-hopped RF signal and the receive LO frequency signal and produce as an output therefrom a baseband version of incoming frequency-hopped RF signal; and a bandpass filter disposed to receive the output from the mixer and configured to pass only a defined frequency band around the baseband version of the incoming frequency-hopped RF signal, providing as an output a recovered version the incoming frequency-hopped wireless signal.

18. A frequency-hopped wireless network, comprising:

a frequency-hopping master device transceiver including a master device wireless transmit section responsive to an input communication signal and providing as an output a frequency-hopped radio frequency (RF) transmit signal version thereof;

a master device wireless receive section responsive to an incoming frequency-hopped RF signal and providing as an output a recovered baseband communication signal related thereto;

an antenna system coupled to an output of the master device wireless transmit section for converting the frequency-hopped RF signal into a frequency-hopped wireless signal for transmission across the frequency-hopped wireless network, the antenna system also coupled to an input of the master device wireless receive section for converting an incoming wireless receive section for converting an incoming frequency-hopped wireless signal into the incoming frequency-hopped RF signal applied as an input to the master device wireless receive section; and a frequency hopping sequence generator configured to create both a first hopping sequence map M1 of available local oscillator (LO) frequencies across a wideband frequency range for use by the master device wireless transmit section and a second hopping sequency map M2 of available LO frequencies across the wideband frequency range for use by the master device wireless receive section, wherein the master device wireless transmit section comprises a frequency synthesizer configured to generate as an output a predefined LO frequency signal in response to a control signal defining a specific LO frequency;

a frequency controller responsive to the first hopping sequence map M1 created by the frequency hopping sequence generator and providing as an output the control signal to the frequency synthesizer so as to control the output generated by the frequency synthesizer to follow a hopping sequence and thereby change the predefined LO frequency signal as a function of time;

a mixer receiving, as separate inputs, the input communication signal and the predefined LO frequency signal generated by the frequency synthesizer, the mixer configured to combine the input communication signal and the predefined LO frequency signal and generate therefrom an initial frequency-hopped RF signal related thereto; and an adjustable bandpass filter positioned at the output of the mixer and configured to pass only a defined band around a center frequency of the initial frequency-hopped RF signal, wherein the center frequency of the adjustable bandpass filter is controlled by the frequency controller, the adjustable bandpass filter providing as an output the frequency-hopped RF signal, thereafter supplied as an input to the antenna system; and the master device wireless receive section comprises a receive frequency synthesizer configured to create as an output a defined receive LO frequency signal in response to a control signal applied as an input thereto;

a frequency controller responsive to the second hopping sequence map M2 created by the frequency hopping sequence generator and providing as an output the control input to the receive frequency synthesizer so as to control the output generated by the receive frequency synthesizer to follow the second hopping sequence map M2 and thereby change the defined receive LO frequency signal as a function of time;

a mixer receiving as inputs the incoming frequency-hopped RF signal received from the antenna system and the defined receive LO frequency signal created by the receive frequency synthesizer, the mixer configured to combine the incoming frequency-hopped RF signal and the receive LO frequency signal and produce as an output therefrom a baseband version of incoming frequency-hopped RF signal; and a bandpass filter disposed to receive the output from the mixer and configured to pass only a defined frequency band around the baseband version of the incoming frequency-hopped RF signal, providing as an output a recovered version the incoming frequency-hopped wireless signal; and a plurality of M frequency-hopping client device wireless transceivers in communication with the frequency-hopping master device, where M is a cardinal number greater than one, each client device wireless transceiver of the plurality of M frequency-hopping client device wireless transceivers comprising a client antenna system for converting a client communication frequency-hopped RF signal into a frequency-hopped wireless client communication signal for transmission across the frequency-hopped wireless network, the antenna system also for converting an incoming frequency-hopped wireless signal into the incoming frequency-hopped RF signal;

a frequency-hopping wireless client transmitter module for transmitting frequency-hopped client communication signals to the master device wireless receive section by using the second hopping sequence map M2 to control frequency hopping, the frequency-hopping wireless client transmitter module including a frequency synthesizer configured to generate as an output a predefined LO frequency signal in response to a control signal defining a specific LO frequency;

a frequency controller responsive to the second hopping sequence map M2 created by the frequency hopping sequence generator and providing as an output the control signal to the frequency synthesizer so as to control the output generated by the frequency synthesizer to follow a hopping sequence and thereby change the predefined LO frequency signal as a function of time;

a mixer receiving, as separate inputs, the client communication signal and the predefined LO frequency signal generated by the frequency synthesizer, the mixer configured to combine the client communication signal and the predefined LO frequency signal and generate therefrom an initial frequency-hopped RF signal related thereto; and an adjustable bandpass filter positioned at the output of the mixer and configured to pass only a defined band around a center frequency of the initial frequency-hopped RF signal, wherein the center frequency of the adjustable bandpass filter is controlled by the frequency controller, the adjustable bandpass filter providing as an output the frequency-hopped RF signal, thereafter supplied as an input to the client antenna system; and a frequency-hopping wireless client receiver module for recovering baseband signals from frequency-hopped wireless communication signals received from the master device wireless transmit section, using the first hopping sequence map M1 to recover the baseband signals from the frequency-hopped received wireless communication signals, the frequency-hopping wireless client receiver module including a receive frequency synthesizer configured to create as an output a defined receive LO frequency signal in response to a control signal applied as an input thereto;

a frequency controller responsive to the first hopping sequence map M1 and providing as an output the control input to the receive frequency synthesizer so as to control the output generated by the receive frequency synthesizer to follow the first hopping sequence map M1 and thereby change the defined receive LO frequency signal as a function of time;

a mixer receiving as inputs the incoming frequency-hopped RF signal received from the client antenna system and the defined receive LO frequency signal created by the receive frequency synthesizer, the mixer configured to combine the incoming frequency-hopped RF signal and the receive LO frequency signal and produce as an output therefrom a baseband version of incoming frequency-hopped RF signal; and a bandpass filter disposed to receive the output from the mixer and configured to pass only a defined frequency band around the baseband version of the incoming frequency-hopped RF signal, providing as an output a recovered version the incoming frequency-hopped wireless signal.

19. The frequency-hopped wireless network as defined in claim 18 wherein at least one frequency-hopping client device wireless transceiver of the plurality of M frequency-hopping client device wireless transceivers further comprises a client device frequency hopping sequence generator configured to create a client hopping sequence map of available local oscillator (LO) frequencies across a wideband frequency range for use by the client device wireless transmit section.

* * * * *